(12) United States Patent
Yu et al.

(10) Patent No.: US 9,728,805 B2
(45) Date of Patent: Aug. 8, 2017

(54) NONAQUEOUS ELECTROLYTE AND LITHIUM SECONDARY BATTERY USING THE SAME

(75) Inventors: Sung-Hoon Yu, Daejeon (KR); Doo Kyung Yang, Daejeon (KR); Jong-Ho Jeon, Daejeon (KR); Min-Jung Jou, Daejeon (KR)

(73) Assignee: LG CHEM, LTD., Seoul (KR)

( * ) Notice: Subject to any disclaimer, the term of this patent is extended or adjusted under 35 U.S.C. 154(b) by 5 days.

(21) Appl. No.: 13/538,548

(22) Filed: Jun. 29, 2012

(65) Prior Publication Data

US 2013/0004859 A1 Jan. 3, 2013

(30) Foreign Application Priority Data

Jul. 1, 2011 (KR) ........................ 10-2011-0065479

(51) Int. Cl.
*H01M 10/052* (2010.01)
*H01M 10/0569* (2010.01)
*H01M 10/0567* (2010.01)

(52) U.S. Cl.
CPC ..... *H01M 10/052* (2013.01); *H01M 10/0567* (2013.01); *H01M 10/0569* (2013.01)

(58) Field of Classification Search
None
See application file for complete search history.

(56) References Cited

U.S. PATENT DOCUMENTS

| | | | |
|---|---|---|---|
| 5,731,106 A * | 3/1998 | Tsutsumi et al. | 429/332 |
| 5,759,714 A | 6/1998 | Matsufuji et al. | |
| 6,472,100 B1 * | 10/2002 | Maruta | 429/218.1 |
| 2003/0165733 A1 * | 9/2003 | Takehara et al. | 429/101 |
| 2005/0019670 A1 * | 1/2005 | Amine et al. | 429/326 |
| 2006/0246352 A1 * | 11/2006 | Kweon | H01M 4/131 429/231.95 |
| 2007/0202406 A1 * | 8/2007 | Takahashi | H01M 10/0566 429/231.3 |
| 2009/0017386 A1 | 1/2009 | Xu et al. | |
| 2011/0045361 A1 * | 2/2011 | Abe et al. | 429/343 |

FOREIGN PATENT DOCUMENTS

| | | | |
|---|---|---|---|
| EP | 0785586 A1 | 7/1997 | |
| JP | 04-337258 | 11/1992 | |
| JP | 06-343076 | 12/1993 | |
| JP | 06-338347 | 12/1994 | |
| JP | 07-065663 | 3/1995 | |
| JP | 07-211361 | 8/1995 | |
| JP | 10-050344 | 2/1996 | |
| JP | 09-106833 | 4/1997 | |
| JP | 09106833 A * | 4/1997 | H01M 10/40 |

(Continued)

OTHER PUBLICATIONS

Machine translation for Tsutsumi et al., JP 09-106833 A.*

(Continued)

*Primary Examiner* — Barbara Gilliam
*Assistant Examiner* — Robert S Carrico
(74) *Attorney, Agent, or Firm* — Birch, Stewart, Kolasch & Birch, LLP

(57) ABSTRACT

Disclosed are a nonaqueous electrolyte for a lithium secondary battery containing a hetero polycyclic compound and a lithium secondary battery using the same.

17 Claims, 1 Drawing Sheet

(56) References Cited

FOREIGN PATENT DOCUMENTS

| | | | |
|---|---|---|---|
| JP | 9-199169 | 7/1997 | |
| JP | 11-111335 | 4/1999 | |
| JP | 11111335 A * | 4/1999 | ............ H01M 10/40 |
| JP | 2001-307736 | 11/2001 | |
| JP | 2001307736 A * | 11/2001 | ............. H01M 4/62 |
| JP | 2002-359002 | 12/2002 | |
| JP | 2003-007333 | 1/2003 | |
| JP | 2003-92137 | 3/2003 | |
| JP | 2004-014352 | 1/2004 | |
| JP | 2004014352 A * | 1/2004 | ............ H01M 10/40 |
| JP | 2008078040 A * | 4/2008 | ............. H01M 4/80 |
| JP | 2008112630 A * | 5/2008 | |
| WO | WO 2009122908 A1 * | 10/2009 | ............ H01M 10/40 |

OTHER PUBLICATIONS

Machine translation for Sakata et al., JP 2001-307736 A.*
Machine translation for Oura et al., JP 2004-014352 A.*
Machie translation for Maruta, JP 11-111335 A.*
Machine translation for Inatomi et al., JP 2008-078040 A.*
"Ethylene Carbonate", "Ethyl Carbonate", and "Pteridine" from ChemSpider.com. Accessed on: May 31, 2015. >http:\\www.chemspider.com<.*
Machine Translation of JP 2008-112630 A, dated May 15, 2008, retrieved Jan. 17, 2017.*

* cited by examiner

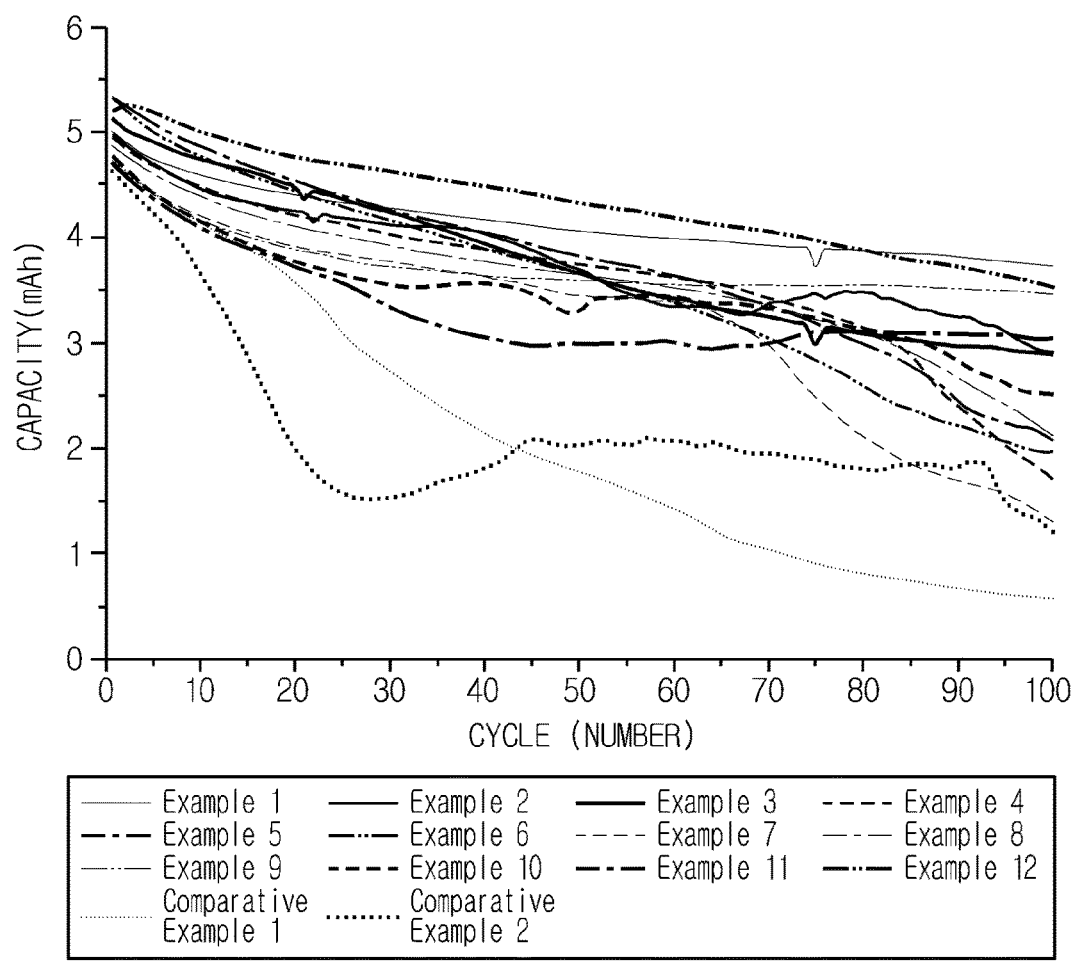

NONAQUEOUS ELECTROLYTE AND LITHIUM SECONDARY BATTERY USING THE SAME

CROSS-REFERENCE TO RELATED APPLICATION

This application claims priority under 35 USC 119(a) to Korean Patent Application No. 10-2011-0065479 filed in the Republic of Korea on Jul. 1, 2011, the entire contents of which are incorporated herein by reference.

BACKGROUND OF THE DISCLOSURE

Field of the Disclosure

The present disclosure relates to a nonaqueous electrolyte for a lithium secondary battery, which includes a hetero polycyclic compound, and a lithium secondary battery using the same.

Description of the Related Art

In recent years, there has been increasing interest in energy storage technologies. As the application fields of energy storage technologies have been extended to mobile phones, camcorders, notebook computers and even electric cars, there has been a growing demand for high energy-density batteries as power sources for such electronic devices. In response to this demand, research on lithium secondary batteries is being actively undertaken.

Lithium secondary batteries developed in the early 1990's are made up of an anode of a carbon-based material capable of intercalating and deintercalating lithium ions, a cathode of lithium containing oxide, and a non-aqueous electrolyte containing a proper amount of lithium salts dissolved in a mixed organic solvent.

The average discharge voltage of the lithium secondary battery is about 3.6 to 3.7 V, which is higher than those of alkali batteries, nickel-cadmium batteries or the like. For such a high operating voltage, an electrolytic composition electrochemically stable in a charge/discharge range of 0~4.2 V is required. For this, a mixed solvent where a cyclic carbonate compound such as ethylene carbonate and propylene carbonate and a linear carbonate compound such as dimethyl carbonate, ethylmethyl carbonate and diethyl carbonate are appropriately mixed is used as a solvent of the electrolyte. A solute of the electrolyte commonly uses a lithium salt such as $LiPF_6$, $LiBF_4$, $LiClO_4$ or the like, which serves as a lithium ion source in a battery and thus enables the lithium battery to operate.

At an initial charging stage of a lithium secondary battery, lithium ions emitting from a cathode active material such as a lithium metal oxide move to an anode active material such as graphite and are intercalated between layers of the anode active material. At this time, since lithium has strong reactivity, the electrolyte is reacted with carbon of the anode active material at the surface of the anode active material such as graphite, thereby generating compounds such as $Li_2CO_3$, $Li_2O$ and $LiOH$. These compounds form a kind of an SEI (Solid Electrolyte Interface) layer on the surface of the anode active material such as graphite.

The SEI layer plays role of an ion tunnel and allows only lithium ions to pass. Due to the ion tunnel effect, the SEI layer prevents organic solvent molecules, which move together with lithium ions in the electrolyte and have large molecular weight, from being intercalated between layers of the anode active material and thus destroying the anode structure. Therefore, since the contact between the electrolyte and the anode active material is prevented, the electrolyte is not dissolved, and the amount of lithium ions in the electrolyte is reversibly maintained, thereby ensuring stable charge/discharge.

However, during the SEI layer forming reaction, the battery thickness may increase at charging due to gases such as $CO$, $CO_2$, $CH_4$ and $C_2H_6$ generated by the dissolution of a carbonate-based solvent. In addition, when the battery is left alone in a fully-charged state at a high temperature, as time passes, the SEI layer may slowly collapse due to the increasing electrochemical energy and thermal energy, which cause side reaction to continuously occur between the exposed surface of the anode and the surrounding electrolyte. Due to the continuous generation of gas, the inner pressure of the battery increases, which results in the increase of thickness of the battery, causing problems in a device such as a cellular phone and a notebook using the battery. In other words, the high-temperature stability is inferior when the battery is left alone. In addition, the above problem caused by the increased inner pressure is more serious at a general lithium secondary battery containing a large amount of ethylene carbonate since the SEI layer is unstable. In addition, since ethylene carbonate has a high freezing point of 37 to 39° C., making it a solid state at room temperature, a lithium battery containing a large amount of ethylene carbonate due to low ion conductivity at a low temperature has bad low-temperature conductivity.

In order to solve this problem, many studies for changing a composition of solvent components in the carbonate organic solvent or changing the aspect of a SEI layer forming reaction by mixing a specific additive have been made. However, as know in the art, in the case of changing a solvent component or adding a specific compound to the electrolyte in order to improve the battery performance, even though some features are improved, other features are deteriorated instead.

Therefore, a nonaqueous electrolyte composition capable of providing a lithium secondary battery with good cycle characteristic, good low-temperature discharge characteristic and good high-temperature discharge characteristic as well as excellent high-rate charge/discharge characteristics should be urgently developed.

SUMMARY OF THE DISCLOSURE

The present disclosure is designed to solve the problems of the prior art, and therefore it is an object of the present disclosure to provide a nonaqueous electrolyte for a lithium secondary battery with an improved high-temperature cycle characteristic and a lithium secondary battery using the same.

In one aspect, the present disclosure provides a nonaqueous electrolyte for a lithium secondary battery, which includes an electrolyte salt and an organic solvent, wherein the nonaqueous electrolyte further includes a hetero polycyclic compound expressed by Chemical Formula 1 below:

Chemical Formula 1

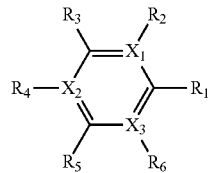

wherein $X_1$, $X_2$, and $X_3$ are independently a carbon atom or a nitrogen atom, where at least one of $X_1$, $X_2$, and $X_3$ is nitrogen, wherein $R_1$, $R_3$, and $R_5$ are independently a substituent selected from the group consisting of hydrogen atoms, substituted or non-substituted aryl groups, substituted or non-substituted aryloxy groups, substituted or non-substituted heteroaryl groups, substituted or non-substituted heteroaryloxy groups, substituted or non-substituted alkyl groups, substituted or non-substituted amino groups, substituted or non-substituted alkoxy groups, halogens, and nitro groups, wherein, in a case where $X_1$, $X_2$, and $X_3$ are carbon, $R_2$, $R_4$, and $R_6$ are independently a substituent selected from the group consisting of hydrogen atoms, substituted or non-substituted aryl groups, substituted or non-substituted heteroaryl groups, substituted or non-substituted alkyl groups, substituted or non-substituted amino groups, substituted or non-substituted alkoxy groups, halogens, and nitro groups, wherein, in a case where $X_1$, $X_2$, and $X_3$ are nitrogen, $R_2$, $R_4$, and $R_6$ respectively represent an unshared electron pair, and wherein $R_1$, $R_2$, $R_3$, $R_4$, $R_5$, and $R_6$ are capable of being fused to form a ring.

In another aspect, the present disclosure provides a lithium secondary battery, which includes an electrode assembly having an anode, a cathode, and a nonaqueous electrolyte, wherein the nonaqueous electrolyte is the above nonaqueous electrolyte for a lithium secondary battery.

According to the present disclosure, by using a lithium secondary battery having a nonaqueous electrolyte containing a hetero polycyclic compound, it is possible to suppress the deterioration of a battery capacity due to high-temperature charge/discharge, improve high-temperature life characteristics of the battery, and prevent the deterioration of a capacity due to aging characteristics of the electrolyte. Therefore, the life characteristics and stability of a secondary battery may be improved.

BRIEF DESCRIPTION OF THE DRAWINGS

Other objects and aspects of the present disclosure will become apparent from the following descriptions of the embodiments with reference to the accompanying drawing in which:

FIG. 1 is a graph showing high-temperature life characteristics of lithium secondary batteries prepared according to Example 2-1 to 2-12 and Comparative Examples 2-1 to 2-2.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A nonaqueous electrolyte for a lithium secondary battery according to an embodiment of the present disclosure further includes a hetero polycyclic compound expressed by Chemical Formula 1 below:

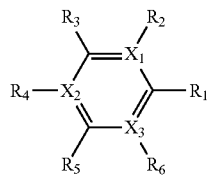

Chemical Formula 1 wherein $X_1$, $X_2$, and $X_3$ are independently a carbon atom or a nitrogen atom, where at least one of $X_1$, $X_2$, and $X_3$ is nitrogen, wherein $R_1$, $R_3$, and $R_5$ are independently a substituent selected from the group consisting of hydrogen atoms, substituted or non-substituted aryl groups, substituted or non-substituted aryloxy groups, substituted or non-substituted heteroaryl groups, substituted or non-substituted heteroaryloxy groups, substituted or non-substituted alkyl groups, substituted or non-substituted amino groups, substituted or non-substituted alkoxy groups, halogens, and nitro groups, wherein, in a case where $X_1$, $X_2$, and $X_3$ are carbon, $R_2$, $R_4$, and $R_6$ are independently a substituent selected from the group consisting of hydrogen atoms, substituted or non-substituted aryl groups, substituted or non-substituted heteroaryl groups, substituted or non-substituted alkyl groups, substituted or non-substituted amino groups, substituted or non-substituted alkoxy groups, halogens, and nitro groups, wherein, in a case where $X_1$, $X_2$, and $X_3$ are nitrogen, $R_2$, $R_4$, and $R_6$ respectively represent an unshared electron pair, and wherein $R_1$, $R_2$, $R_3$, $R_4$, $R_5$, and $R_6$ are capable of being fused to form a ring.

The hetero polycyclic compound corresponds to a multi-ring nitrogen compound having at least one nitrogen atom in a ring, and the nitrogen-containing hetero polycyclic compound may form a polymeric film with a high degree of polymerization on an electrode surface due to sufficient polymerization reactivity. Since the polymeric film is difficult to peel off from an electrode, if the polymeric film is formed on an electrode, the elution of metal cation from a cathode active material layer and the education of metal at the surface of an anode may be suppressed for a longer time. Therefore, a nonaqueous electrolyte secondary battery with even more excellent high-temperature life characteristics may be obtained.

In addition, since rich electrons present at a multi ring as well as nitrogen atoms are delocalized, radicals generated at an electrochemical reaction may be stabilized, and so a film may be easily formed.

The hetero polycyclic compound expressed by Chemical Formula 1 may have at least two rings, namely at least two fused rings, or at least two rings connected by a single bond, oxygen or sulfur.

In detail, the term "at least two rings connected by a single bond, oxygen or sulfur" represents a structure where a benzene group and an aryl group or a heteroaryl group are connected by a single bond, oxygen or sulfur, like a case where $R_1$, $R_2$, $R_3$, $R_4$, $R_5$, and $R_6$, which are substituents bonded to carbon of a basic benzene ring of Chemical Formula 1, is a substituted or non-substituted aryl group, a substituted or non-substituted aryloxy group, a substituted or non-substituted heteroaryl group, or a substituted or non-substituted heteroaryloxy group.

In addition, the term "at least two fused rings" represents a structure where two substituents arbitrarily selected from $R_1$, $R_2$, $R_3$, $R_4$, $R_5$, and $R_6$ are fused with each other to form a ring, in a case where $R_1$, $R_2$, $R_3$, $R_4$, $R_5$, and $R_6$, which are substituents bonded to carbon of a basic benzene ring of Chemical Formula 1, is not selected from substituted or non-substituted aryl groups, substituted or non-substituted aryloxy groups, substituted or non-substituted heteroaryl groups, substituted or non-substituted heteroaryloxy groups.

At this time, among substituents bonded to carbon of a ring formed by fusing, two substituents may be fused with each other to form another ring.

The hetero polycyclic compound expressed by Chemical Formula 1 may be at least one kind of compounds expressed by Chemical Formulas 2 to 4 below.

Chemical Formula 2

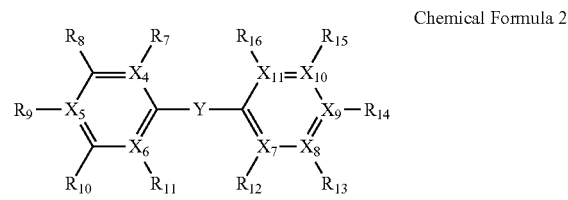

wherein $X_4$, $X_5$, $X_6$, $X_7$, $X_8$, $X_9$, $X_{10}$, and $X_{11}$ are independently a carbon atom or a nitrogen atom, where at least one of $X_4$, $X_5$, and $X_6$ is nitrogen, wherein, in a case where $X_4$, $X_5$, $X_6$, $X_7$, $X_8$, $X_9$, $X_{10}$, and $X_{11}$ are carbon, $R_7$, $R_9$, $R_{11}$, $R_{12}$, $R_{13}$, $R_{14}$, $R_{15}$ and $R_{16}$ are independently a substituent selected from the group consisting of hydrogen atom, substituted or non-substituted aryl group, substituted or non-substituted heteroaryl group, substituted or non-substituted alkyl group, substituted or non-substituted amino group, substituted or non-substituted alkoxy group, halogen, and nitro group, wherein, in a case where $X_4$, $X_5$, $X_6$, $X_7$, $X_8$, $X_9$, $X_{10}$, and $X_{11}$ are nitrogen, $R_7$, $R_9$, $R_{11}$, $R_{12}$, $R_{13}$, $R_{14}$, $R_{15}$ and $R_{16}$ respectively represent an unshared electron pair, wherein $R_8$ and $R_{10}$ are independently a substituent selected from the group consisting of hydrogen atom, substituted or non-substituted aryl group, substituted or non-substituted aryloxy group, substituted or non-substituted heteroaryl group, substituted or non-substituted heteroaryloxy group, substituted or non-substituted alkyl group, substituted or non-substituted amino group, substituted or non-substituted alkoxy group, halogen, and nitro group, and wherein Y is a single bond, oxygen or sulfur.

Chemical Formula 3

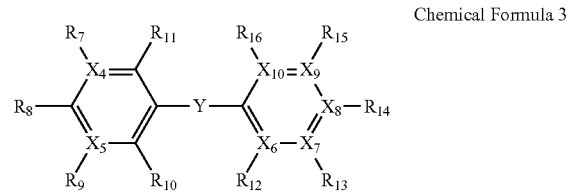

wherein $X_4$, $X_5$, $X_6$, $X_7$, $X_8$, $X_9$, and $X_{10}$ are independently a carbon atom or a nitrogen atom, where at least one of $X_4$ and $X_5$ is nitrogen, wherein $X_4$, $X_5$, $X_6$, $X_7$, $X_8$, $X_9$, and $X_{10}$ are carbon, $R_7$, $R_9$, $R_{12}$, $R_{13}$, $R_{14}$, $R_{15}$ and $R_{16}$ are independently a substituent selected from the group consisting of hydrogen atom, substituted or non-substituted aryl group, substituted or non-substituted aryloxy group, substituted or non-substituted heteroaryl group, substituted or non-substituted heteroaryloxy group, substituted or non-substituted alkyl group, substituted or non-substituted amino group, substituted or non-substituted alkoxy group, halogen, and nitro group, wherein, in a case where $X_4$, $X_5$, $X_6$, $X_7$, $X_8$, $X_9$, and $X_{10}$ are nitrogen, $R_7$, $R_9$, $R_{12}$, $R_{13}$, $R_{14}$, $R_{15}$ and $R_{16}$ respectively represent an unshared electron pair, wherein $R_8$, $R_{10}$ and $R_{11}$ are independently a substituent selected from the group consisting of hydrogen atom, substituted or non-substituted aryl group, substituted or non-substituted aryloxy group, substituted or non-substituted heteroaryl group, substituted or non-substituted heteroaryloxy group, substituted or non-substituted alkyl group, substituted or non-substituted amino group, substituted or non-substituted alkoxy group, halogen, a nitro group, and wherein Y is a single bond, oxygen or sulfur.

Chemical Formula 4

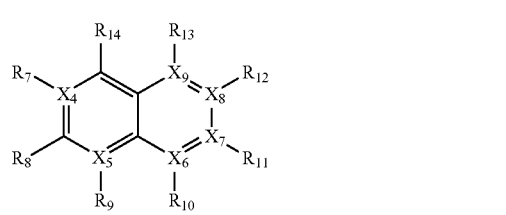

wherein $X_4$, $X_5$, $X_6$, $X_7$, $X_8$, and $X_9$ are independently a carbon atom or a nitrogen atom, where at least one of $X_4$ and $X_5$ is nitrogen, wherein, in a case where $X_4$, $X_5$, $X_6$, $X_7$, $X_8$, and $X_9$ are carbon, $R_7$, $R_9$, $R_{10}$, $R_{11}$, $R_{12}$ and $R_{13}$ are independently a substituent selected from the group consisting of hydrogen atom, substituted or non-substituted aryl group, substituted or non-substituted aryloxy group, substituted or non-substituted heteroaryl group, substituted or non-substituted heteroaryloxy group, substituted or non-substituted alkyl group, substituted or non-substituted amino group, substituted or non-substituted alkoxy group, halogen, and nitro group, wherein, in a case where $X_4$, $X_5$, $X_6$, $X_7$, $X_8$, and $X_9$ are nitrogen, $R_7$, $R_9$, $R_{10}$, $R_{11}$, $R_{12}$ and $R_{13}$ respectively represent an unshared electron pair, and wherein $R_8$ and $R_{14}$ are independently a substituent selected from the group consisting of hydrogen atom, substituted or non-substituted aryl group, substituted or non-substituted aryloxy group, substituted or non-substituted heteroaryl group, substituted or non-substituted heteroaryloxy group, substituted or non-substituted alkyl group, substituted or non-substituted amino group, substituted or non-substituted alkoxy group, halogen, and a nitro group.

In detail, the hetero polycyclic compound expressed by Chemical Formula 2 may be one of compounds expressed by Chemical Formulas 5 to 15 below.

[Chemical Formula 5]

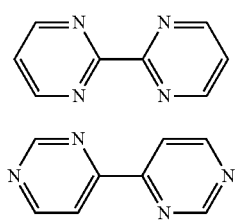

[Chemical Formula 6]

-continued

[Chemical Formula 7]
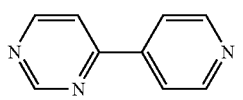

[Chemical Formula 8]
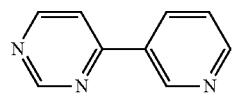

[Chemical Formula 9]
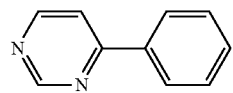

[Chemical Formula 10]
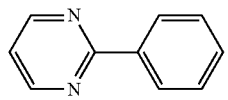

[Chemical Formula 11]
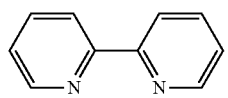

[Chemical Formula 12]
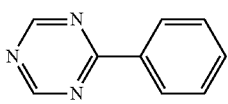

[Chemical Formula 13]
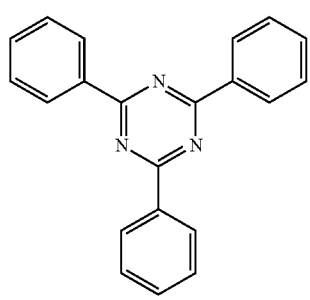

[Chemical Formula 14]

[Chemical Formula 15]

In addition, the hetero polycyclic compound expressed by Chemical Formula 3 may be one of compounds expressed by Chemical Formulas 16 to 20 below.

[Chemical Formula 16]
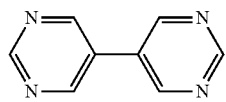

[Chemical Formula 17]
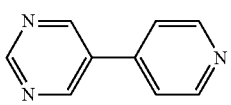

[Chemical Formula 18]
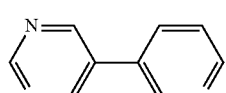

[Chemical Formula 19]
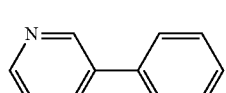

[Chemical Formula 20]
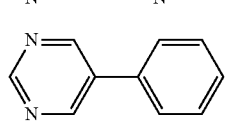

In addition, the hetero polycyclic compound expressed by Chemical Formula 4 may be one of compounds expressed by Chemical Formulas 21 to 31 below.

[Chemical Formula 21]

[Chemical Formula 22]

[Chemical Formula 23]

[Chemical Formula 24]

[Chemical Formula 25]

[Chemical Formula 26]

[Chemical Formula 27]

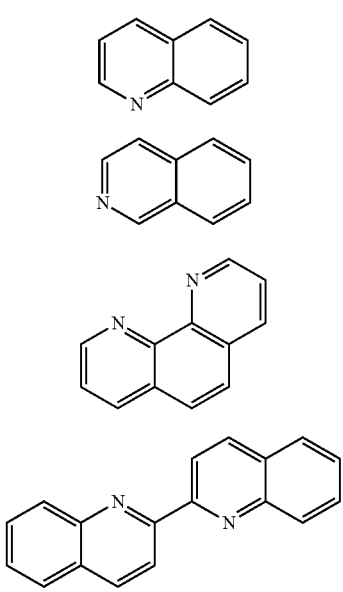

[Chemical Formula 28]

[Chemical Formula 29]

[Chemical Formula 30]

[Chemical Formula 31]

The content of the hetero polycyclic compound may be 0.05 to 20 parts by weight or 0.1 to 10 parts by weight, based on 100 parts by weight of the nonaqueous electrolyte.

If the content of the hetero polycyclic compound satisfies the above condition, the life characteristics may be sufficiently improved, the cathode discharge reaction is not deteriorated, and the polymeric film formed on an electrode surface is suitably adjusted to help reactions between the electrode and lithium ions in the nonaqueous electrolyte so that lithium ions may be easily intercalated and deintercalated to/from the electrode. In addition, since rich electrons present at a multi ring as well as nitrogen atoms are delocalized, radicals generated at an electrochemical reaction may be stabilized, and so a film may be easily formed.

Each substituent used in the definition of the compound according to the present disclosure may be defined as follows.

The alkyl group which is a substituent used in the present disclosure represents a linear or branched saturated monovalent hydrocarbon having 1 to 20 carbon atoms, preferably 1 to 10 carbon atoms, more preferably 1 to 6 carbon atoms. The non-substituted alkyl group which is a substituent used in the present disclosure may be, for example, methyl, ethyl, propyl, isobutyl, sec-butyl, tert-butyl, pentyl, iso-amyl, hexyl or the like, and at least one hydrogen atom included in the alkyl group may be substituted with a halogen atom, a hydroxyl group, a nitro group, a cyano group, a substituted or non-substituted amino group (—$NH_2$, —NH(R), —N(R')(R"), where R' and R" are independently an alkyl group having 1 to 10 carbons), an amidino group, a hydrazine group, a hydrazone group, a carboxyl group, a sulfuric acid group, a phosphate group, an alkyl group of C1-C20, a halogenated alkyl group of C1-C20, an alkenyl group of C1-C20, an alkynyl of C1-C20, a heteroalkyl group of C1-C20, an aryl group of C6-C20, an arylalkyl group of C6-C20, a heteroaryl group of C6-C20, or a heteroarylalkyl group of C6-C20.

The aryl group which is a substituent used in the present disclosure represents a monovalent monocyclic, bicyclic or tricyclic aromatic hydrocarbon portion having 6 to 30 ring elements, preferably 6 to 18 ring elements, and the aryl group may be arbitrarily substituted with at least one halogen substituent. The aromatic portion of the aryl group includes only carbon atoms. The aryl group may be, for example, phenyl, naphthalenyl or fluorenyl, and at least one hydrogen atom in the aryl group may be substituted with a substituent like the case of the alkyl group.

The aryloxy group which is a substituent used in the present disclosure represents a radical of a "—O-aryl" structure where oxygen is bonded to a single carbon in a ring element of the aryl group, and aryl used herein is already defined above. In the aryloxy group, at least one hydrogen atom may be substituted with a substituent identical to the case of the alkyl group.

The heteroaryl group which is a substituent used in the present disclosure represents a ring aromatic system having 5 to 30 ring elements where 1 to 3 hetero elements selected from N, O, P and S are used and the other ring elements are C, and the rings may be fused or attached together by means of a pendent method. In addition, at least one hydrogen atom in the heteroaryl group may be substituted with a substituent identical to the case of the alkyl group.

The heteroaryloxy group which is a substituent used in the present disclosure represents a radical of a "—O-heteroaryl" structure where oxygen is fused to a single carbon among ring elements of the heteroaryl group, and heteroaryl used herein is already defined above. At least one hydrogen atom in the heteroaryloxy group may be substituted with a substituent identical to the case of the alkyl group.

The amino group used in the present disclosure represents —$NH_2$, —NH(R) or —N(R')(R"), and R' and R" are independently an alkyl group having 1 to 10 carbons. At this time, at least one hydrogen atom in the amino group may be substituted with a substituent identical to the case of the alkyl group.

The alkoxy group which is a substituent used in the present disclosure represents a radical of a "—O-alkyl" structure where oxygen is bonded to one of carbon atoms of the alkyl group, and alkyl used herein is already defined above. The alkyl group may be, for example, methoxy, ethoxy, propoxy, isobutyloxy, sec-butyloxy, pentyloxy, iso-amyloxy, hexyloxy or the like, and at least one hydrogen atom in the alkoxy group may be substituted with a substituent identical to the case of the alkyl group.

The halogen used in the present disclosure represents fluorine, chlorine, bromide, iodine, or astatine.

The electrolyte salt included in the nonaqueous electrolyte according to an embodiment of the present disclosure is a lithium salt.

The lithium salt may use any salt commonly used in an electrolyte for a lithium secondary battery without limitation. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent included in the nonaqueous electrolyte may use a solvent commonly used in an electrolyte for a lithium secondary battery without limitation, and may employ, for example, linear carbonate, cyclic carbonate, ether, ester, amide or the like, solely or in combination.

Among them, cyclic carbonate, linear carbonate, or their mixture, namely a carbonate compound, may be representatively included.

The cyclic carbonate compound may be, for example, any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, or their halides and their mixtures. The halides may be, for example, fluoroethylene carbonate (FEC), without being limited thereto.

In addition, the linear carbonate compound may be, for example, any one selected from the group consisting of dimethyl carbonate (DMC), diethyl carbonate (DEC), dipropyl carbonate, ethylmethyl carbonate (EMC), methylpropyl carbonate and ethylpropyl carbonate, or their mixtures, without being limited thereto.

Particularly, among the carbonate-based organic solvents, the cyclic carbonate such as ethylene carbonate and propylene carbonate is a high-viscosity organic solvent and may dissociate the lithium salt in an electrolyte in a better way due to high dielectric permittivity. If a low-viscosity low-permittivity linear carbonate such as dimethyl carbonate and diethyl carbonate is suitably mixed to the above cyclic carbonate at an appropriate ratio, an electrolyte with higher electric conductivity may be obtained.

In addition, the ether in the organic solvent may be any one selected from the group consisting of dimethyl ether, diethyl ether, dipropyl ether, methylethyl ether, methylpropyl ether and ethylpropyl ether, or their mixtures, without being limited thereto.

Moreover, the ester in the organic solvent may be any one selected from the group consisting of methyl acetate, ethyl acetate, propyl acetate, methyl propionate, ethyl propionate, γ-butyrolactone, γ-valerolactone, γ-caprolactone, σ-valerolactone and ∈-caprolactone, or their mixtures, without being limited thereto.

The nonaqueous electrolyte for a lithium secondary battery according to an embodiment of the present disclosure may further include an additive for forming a SEI layer, well known in the art, within the scope not departing from the object of the present disclosure. The additive for forming a SEI layer available in the present disclosure may use any one of cyclic sulfite, saturated sultone, unsaturated sultone, and non-cyclic sulfone, or their mixtures, without being limited thereto. In addition, among the cyclic carbonates mentioned above, vinylene carbonate and vinylethylene carbonate may also be used as an additive for forming a SEI layer in order to improve the life characteristic of a battery. The cyclic sulfite may be ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite or the like, the saturated sultone may be 1,3-propane sultone, 1,4-butane sultone or the like, the unsaturated sultone may be ethene sultone, 1,3-propene sultone, 1,4-butene sultone, 1-methyl-1,3-propene sultone or the like, and the non-cyclic sulfone may be divinyl sulfone, dimethyl sulfone, diethyl sulfone, methylethyl sulfone, methylvinyl sulfone or the like.

The additive for forming a SEI layer may be included by a suitable content depending on its kind, and the content may be, for example 0.001 to 10 parts by weight, based on 100 parts by weight of the nonaqueous electrolyte.

The nonaqueous electrolyte may be used as an electrolyte of a lithium secondary battery in the form of a liquid electrolyte or a gel polymer electrolyte impregnated in a polymer.

The nonaqueous electrolyte according to an embodiment of the present disclosure may be obtained by mixing the electrolyte salt in a nonaqueous solvent and then mixing and dissolving the hetero polycyclic compound.

At this time, the compound added to the nonaqueous solvent and the electrolyte may be refined in advance within the scope not deteriorating the productivity so that the compound has very small impurities.

The nonaqueous electrolyte may include air or carbon dioxide in order to suppress the generation of gas caused by the decomposed electrolyte and further improve the battery characteristics such as long-term cycle characteristic and charge preservation characteristic.

In the aspect of the improvement of the high-temperature charge/discharge characteristic, an electrolyte obtained by dissolving carbon dioxide in a nonaqueous electrolyte may be used. The amount of dissolved carbon dioxide may be 0.001 weight % or above, 0.05 weight % or above, or 0.2 weight % or above, based on the weight of the nonaqueous electrolyte, and carbon dioxide may be dissolved in the nonaqueous electrolyte until it comes to a saturated status.

In addition, an embodiment of the present disclosure provides a lithium secondary battery, which includes an electrode assembly having an anode, a cathode, and a separator interposed between the cathode and the anode; and a nonaqueous electrolyte injected into the electrode assembly, wherein the nonaqueous electrolyte is the nonaqueous electrolyte for a lithium secondary battery, described above.

The cathode, the anode and the separator of the electrode assembly may employ common ones widely used for manufacturing a lithium secondary battery.

The cathode includes a cathode layer having cathode active material, conductive material and binder, which is supported at a single surface or both surfaces of a current collector.

The cathode active material may preferably use a lithium-containing transition metal oxide, and may use, for example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or their mixtures.

The lithium-containing transition metal oxide may be coated with metal such as aluminum (Al) or metal oxide. In addition, sulfide, selenide and halide may also be used instead of the lithium-containing transition metal oxide.

The conductive material may be any electrically conductive material that does not cause chemical changes in electrochemical devices. Generally, carbon black, graphite, carbon fiber, carbon nanotubes, metal powder, conductive metal oxides and organic conductive materials can be used. Examples of currently available commercial products for the conductive material include acetylene black series (Chevron Chemical Company and Gulf Oil Company), Ketjen Black EC series (Armak Company), Vulcan XC-72 (Cabot Company), and Super P (MMM Company).

The anode is configured so that an anode layer having anode active material and a binder is supported by a single surface or both surfaces of the current collector.

The anode active material may be generally carbon material capable of intercalating/deintercalating lithium ions, lithium metal, lithium metals, and metal compounds, or their mixtures.

In detail, the carbon material may use low crystallinity carbon or high crystallinity carbon. The low crystallinity carbon representatively includes soft carbon and hard carbon, and the high crystallinity carbon representatively includes high-temperature sintered carbon such as natural graphite, Kish graphite, pyrolytic carbon, mesophase pitch based carbon fiber, meso-carbon microbeads, mesophase pitches, and petroleum or coal tar pitch derived cokes.

The metal compound may contain at least one kind of metal element such as Si, Ge, Sn, Pb, P, Sb, Bi, Al, Ga, In, Ti, Mn, Fe, Co, Ni, Cu, Zn, Ag, Mg, Sr, and Ba. This metal compound may be used in any form of groups, alloys, oxides ($TiO_2$, $SnO_2$ or the like), nitrides, sulfides, borides, alloys with lithium, or the like. However, groups, alloys, oxides and alloys with lithium may need large capacity. Among them, at least one kind of element selected from Si, Ge and Sn may be used, and the battery may have larger capacity if at least one kind of element selected from Si and Sn is included.

The binder used in the cathode and the anode plays a role of maintaining the cathode active material and the anode active material at a current collector and connecting active materials, and a common binder may be used without limitation.

For example, various kinds of binder polymer such as polyvinylidenefluoride-hexafluoropropylene copolymer (PVDF-co-HFP), polyvinylidenefluoride, polyacrylonitrile, polymethylmethacrylate, styrene butadiene rubber (SBR), and carboxymethyl cellulose (CMC) may be used.

The current collector used in the cathode and the anode is made of a highly conductive metal material, and any metal material that is not reactive in the voltage range of a battery may be used for the current collector so long as the slurry of the active material can easily be adhered thereto. The cathode current collector may be a foil or the like made of aluminum, nickel or their mixtures, without being limited thereto. The anode current collector may be a foil or the like made of copper, gold, nickel, or copper alloys or their mixtures, without being limited thereto. In addition, the current collector may use a laminate of substrates made of the above materials.

The cathode and the anode are prepared by mixing active material, conductive material, and a binder with a solvent having a high boiling point to make an electrode compound, then applying the compound to a copper foil of a current collector or the like, drying and compression-molding the compound, and then heating the compound at a temperature of 50° C. to 250° C. for about 2 hours in a vacuum.

In addition, the electrode layer of the cathode may have a thickness (on one surface of the current collector) of 30 to 120 μm, or 50 to 100 μm, the electrode layer of the anode may have a thickness of 1 to 100 μm, or 3 to 70 μm. If the cathode and the anode satisfy the above thickness range, the electrode material layer ensures a sufficient amount of active material, and so it is possible to prevent the battery capacity from decreasing and improve the cycle characteristics and the rate characteristics.

In addition, the separator may use a porous polymer film commonly used as a conventional separator, for example a porous polymer film made from polyolefin-based polymer such as ethylene homopolymer, propylene homopolymer, ethylene/butene copolymer, ethylene/hexene copolymer, and ethylene/methacrylate copolymer, or their laminates, and a porous non-woven fabric made from, for example, high-melting glass fibers or polyethylene terephthalate fibers may be used, without being limited thereto.

The lithium secondary battery of the present invention is not limited to a specific shape, but may have a cylindrical shape, a prismatic shape, a pouch shape, or a coin shape.

Hereinafter, the present invention will be described in detail through specific examples. How ever, the description proposed herein is just a preferable example for the purpose of illustrations only, not intended to limit the scope of the invention, so it should be understood that the examples are provided for a more definite explanation to an ordinary person skilled in the art.

Preparation of Nonaqueous Electrolyte

Example 1-1

30 volume % of fluoroethylene carbonate (FEC), 10 volume % of propylene carbonate (PC) and 60 volume % of ethylmethyl carbonate (EMC) were mixed to prepare a mixed liquid. After that, 2 parts by weight of 1,3-propane sultone and 1 part by weight of 4-phenylpyrimidine (Chemical Formula 9) were further added thereto based on 100 parts by weight of the prepared mixed liquid, and then $LiPF_6$ was dissolved therein to have a concentration of 1 M, thereby preparing a nonaqueous electrolyte.

Example 1-2

A nonaqueous electrolyte was prepared in the same way as Example 1-1, except that 2,2'-bipyrimidine (Chemical Formula 5) was used instead of 4-phenylpyrimidine.

Example 1-3

A nonaqueous electrolyte was prepared in the same way as Example 1-1, except that quinazoline (Chemical Formula 27) was used instead of 4-phenylpyrimidine.

Example 1-4

A nonaqueous electrolyte was prepared in the same way as Example 1-1, except that 2,2'-bipyridyl (Chemical Formula 11) was used instead of 4-phenylpyrimidine.

Example 1-5

A nonaqueous electrolyte was prepared in the same way as Example 1-1, except that quinoline (Chemical Formula 28) was used instead of 4-phenylpyrimidine.

Example 1-6

A nonaqueous electrolyte was prepared in the same way as Example 1-1, except that isoquinoline (Chemical Formula 29) was used instead of 4-phenylpyrimidine.

Example 1-7

A nonaqueous electrolyte was prepared in the same way as Example 1-1, except that 0.1 part by weight of 1,10-phenanthroline (Chemical Formula 30) was used instead of 1 part by weight of 4-phenylpyrimidine.

Example 1-8

A nonaqueous electrolyte was prepared in the same way as Example 1-1, except that 0.5 part by weight of 2,2'-biquinoline (Chemical Formula 31) was used instead of 1 part by weight of 4-phenylpyrimidine.

Example 1-9

A nonaqueous electrolyte was prepared in the same way as Example 1-1, except that 0.5 part by weight of 2-phenyl- 1,3,5-triazine (Chemical Formula 32) was used instead of 1 part by weight of 4-phenylpyrimidine.

Example 1-10

A nonaqueous electrolyte was prepared in the same way as Example 1-1, except that 0.05 part by weight of 2,4,6-triphenyl-1,3,5-triazine (Chemical Formula 13) was used instead of 1 part by weight of 4-phenylpyrimidine.

Example 1-11

A nonaqueous electrolyte was prepared in the same way as Example 1-1, except that 0.1 part by weight of 2,4,6-triphenoxy-1,3,5-triazine (Chemical Formula 14) was used instead of 1 part by weight of 4-phenylpyrimidine.

Example 1-12

A nonaqueous electrolyte was prepared in the same way as Example 1-1, except that 0.1 part by weight of 2,4,6-pyridyl-1,3,5-triazine (Chemical Formula 15) was used instead of 1 part by weight of 4-phenylpyrimidine.

Comparative Example 1-1

A nonaqueous electrolyte was prepared in the same way as Example 1-1, except that 4-phenylpyrimidine was not used.

Comparative Example 1-2

A nonaqueous electrolyte was prepared in the same way as Example 1-1, except that biphenyl was used instead of 4-phenylpyrimidine.

Preparation of Lithium Secondary Battery

Example 2-1

Electrodes were prepared by using $LiCoO_2$ as a cathode and natural graphite as an anode, and then the nonaqueous electrolyte prepared in Example 1-1 was injected in a common way to prepare a lithium secondary battery.

Example 2-2

A lithium secondary battery was prepared in the same way as Example 2-1, except that the nonaqueous electrolyte prepared in Example 1-2 was used.

Example 2-3

A lithium secondary battery was prepared in the same way as Example 2-1, except that the nonaqueous electrolyte prepared in Example 1-3 was used.

Example 2-4

A lithium secondary battery was prepared in the same way as Example 2-1, except that the nonaqueous electrolyte prepared in Example 1-4 was used.

Example 2-5

A lithium secondary battery was prepared in the same way as Example 2-1, except that the nonaqueous electrolyte prepared in Example 1-5 was used.

Example 2-6

A lithium secondary battery was prepared in the same way as Example 2-1, except that the nonaqueous electrolyte prepared in Example 1-6 was used.

Example 2-7

A lithium secondary battery was prepared in the same way as Example 2-1, except that the nonaqueous electrolyte prepared in Example 1-7 was used.

Example 2-8

A lithium secondary battery was prepared in the same way as Example 2-1, except that the nonaqueous electrolyte prepared in Example 1-8 was used.

Example 2-9

A lithium secondary battery was prepared in the same way as Example 2-1, except that the nonaqueous electrolyte prepared in Example 1-9 was used.

Example 2-10

A lithium secondary battery was prepared in the same way as Example 2-1, except that the nonaqueous electrolyte prepared in Example 1-10 was used.

Example 2-11

A lithium secondary battery was prepared in the same way as Example 2-1, except that the nonaqueous electrolyte prepared in Example 1-11 was used.

Example 2-12

A lithium secondary battery was prepared in the same way as Example 2-1, except that the nonaqueous electrolyte prepared in Example 1-12 was used.

Comparative Example 2-1

A lithium secondary battery was prepared in the same way as Example 2-1, except that the nonaqueous electrolyte prepared in Comparative Example 1-1 was used.

Comparative Example 2-2

A lithium secondary battery was prepared in the same way as Example 2-1, except that the nonaqueous electrolyte prepared in Comparative Example 1-2 was used.

Evaluation of Characteristics of Lithium Secondary Battery

High-Temperature Life Characteristic

The lithium secondary batteries (with a battery capacity of 5.5 mAh) prepared according to Examples 2-1 to 2-12 and Comparative Examples 2-1 to 2-2 were charged with a constant current of 0.7 C at 60° C. to 4.35V and then charged with a constant voltage of 4.35V, and then the charging process was stopped when the charge current came to 0.275 mA. After that, the lithium secondary batteries were left alone for 10 minutes and then discharged with a constant current of 0.5 C to 3.0V. This charge/discharge cycle was performed 100 times and then the battery capacity was measured. The measurement results are shown in FIG. 1. H ere, C represents C-rate, which is a charge/discharge current rate of a battery, expressed by Ampere (A), and is generally expressed as a ratio to a battery capacity. In other words, 1C for the above batteries means a current of 5.5 mA.

Referring to FIG. 1, it could be understood that the lithium secondary battery having the nonaqueous electrolyte containing a hetero polycyclic compound has excellent life characteristics at high temperature in comparison to a lithium secondary battery having an electrolyte without a hetero polycyclic compound.

What is claimed is:

1. A lithium secondary battery, comprising:
an electrode assembly having an anode, a cathode, and a separator interposed between the cathode and the anode; and
a nonaqueous electrolyte injected into the electrode assembly, wherein the nonaqueous electrolyte is the nonaqueous electrolyte for a lithium secondary battery which includes an electrolyte salt and an organic solvent, and
a polymeric film formed on the electrode assembly formed with a hetero polycyclic compound,
wherein the nonaqueous electrolyte further includes the hetero polycyclic compound,
wherein the hetero polycyclic compound is at least one type of compound expressed by Chemical Formulas 2 to 4 below:

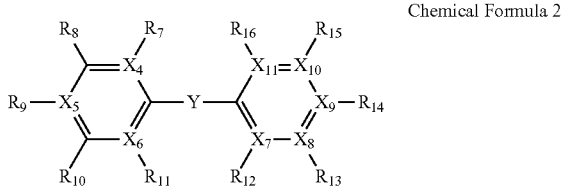

Chemical Formula 2 wherein $X_4$, $X_5$, $X_6$, $X_7$, $X_8$, $X_9$, $X_{10}$, and $X_{11}$ are independently a carbon atom or a nitrogen atom, where at least one of $X_4$, $X_5$, and $X_6$ is nitrogen, and at least one of $X_7$, $X_8$, $X_9$, $X_{10}$ and $X_{11}$ is nitrogen,
provided that compounds wherein one of $X_4$, $X_5$, and $X_6$ is nitrogen, and simultaneously one of $X_7$, $X_8$, $X_9$, $X_{10}$, and $X_{11}$ is nitrogen are excluded, provided that compounds wherein $X_4$, $X_6$, $X_7$, and $X_{11}$ are nitrogen, and simultaneously $X_5$, $X_8$, $X_9$, and $X_{10}$ are carbon are excluded, and provided that compounds wherein three of $X_7$, $X_8$, $X_9$, $X_{10}$, and $X_{11}$ are nitrogen are excluded, provided that compounds wherein all of $X_4$, $X_5$, $X_6$, $X_7$, $X_8$, $X_9$, $X_{10}$, and $X_{11}$ are carbon are excluded,
wherein, in a case where $X_4$, $X_5$, $X_6$, $X_7$, $X_8$, $X_9$, $X_{10}$, or $X_{11}$ are carbon, $R_7$, $R_9$, $R_{11}$, $R_{12}$, $R_{13}$, $R_{14}$, $R_{15}$ or $R_{16}$ bonded thereto are independently a substituent selected from the group consisting of hydrogen atoms, alkyl groups having 1 to 6 carbon atoms, and alkoxy groups having 1 to 6 carbon atoms,
wherein, in a case where $X_4$, $X_5$, $X_6$, $X_7$, $X_8$, $X_9$, $X_{10}$, or $X_{11}$ are nitrogen, $R_7$, $R_9$, $R_{11}$, $R_{12}$, $R_{13}$, $R_{14}$, $R_{15}$ or $R_{16}$ bonded thereto respectively represent an unshared electron pair,
wherein $R_8$ and $R_{10}$ are independently a substituent selected from the group consisting of hydrogen atoms, alkyl groups having 1 to 6 carbon atoms, and alkoxy groups having 1 to 6 carbon atoms, wherein Y is a single bond, oxygen or sulfur,

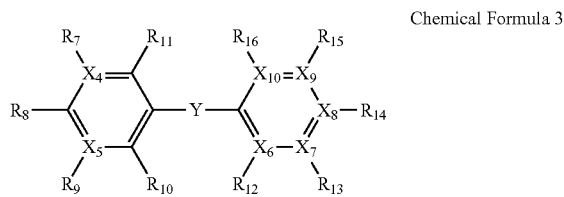

Chemical Formula 3 wherein $X_4$, $X_5$, $X_6$, $X_7$, $X_8$, $X_9$, and $X_{10}$ are independently a carbon atom or a nitrogen atom, where at least one of $X_4$ and $X_5$ is nitrogen, and at least one of $X_6$, $X_7$, $X_8$, $X_9$ and $X_{10}$ is nitrogen, provided that compounds wherein one of $X_4$, and $X_5$ is nitrogen, and simultaneously one of $X_6$, $X_7$, $X_8$, $X_9$, and $X_{10}$ is nitrogen are excluded, and provided that compounds wherein three of $X_6$, $X_7$, $X_8$, $X_9$, and $X_{10}$ are nitrogen are excluded, provided that compounds wherein all of $X_4$, $X_5$, $X_6$, $X_7$, $X_8$, $X_9$ and $X_{10}$ are carbon are excluded,
wherein $X_4$, $X_5$, $X_6$, $X_7$, $X_8$, $X_9$, or $X_{10}$ are carbon, $R_7$, $R_9$, $R_{12}$, $R_{13}$, $R_{14}$, $R_{15}$ or $R_{16}$ bonded thereto are independently a substituent selected from the group consisting of hydrogen atoms, alkyl groups having 1 to 6 carbon atoms, and alkoxy groups having 1 to 6 carbon atoms,
wherein, in a case where $X_4$, $X_5$, $X_6$, $X_7$, $X_8$, $X_9$, or $X_{10}$ are nitrogen, $R_7$, $R_9$, $R_{12}$, $R_{13}$, $R_{14}$, $R_{15}$ or $R_{16}$ bonded thereto respectively represent an unshared electron pair,
wherein $R_8$, $R_{10}$, and $R_{11}$ are independently a substituent selected from the group consisting of hydrogen atoms, alkyl groups having 1 to 6 carbon atoms, and alkoxy groups having 1 to 6 carbon atoms,
wherein Y is a single bond, oxygen or sulfur,

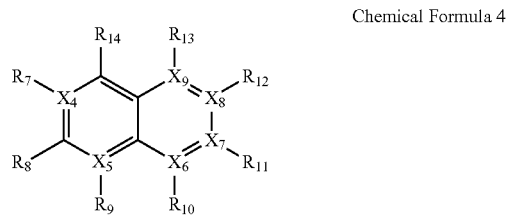

Chemical Formula 4 wherein $X_4$, $X_5$, $X_6$, $X_7$, $X_8$, and $X_9$ are independently a carbon atom or a nitrogen atom, where at least one of $X_4$ and $X_5$ is nitrogen, and at least one of, $X_6$, $X_7$, $X_8$, and $X_9$ is nitrogen,
provided that compounds wherein all of $X_4$ and $X_5$ are nitrogen, and simultaneously all of $X_6$ and $X_9$ are nitrogen are excluded, and provided that compounds wherein all of $X_4$, $X_5$, $X_6$, $X_7$, $X_8$ and $X_9$ are carbon are excluded,
wherein, in a case where $X_4$, $X_5$, $X_6$, $X_7$, $X_8$, or $X_9$ are carbon, $R_7$, $R_9$, $R_{10}$, $R_{11}$, $R_{12}$ or $R_{13}$ bonded thereto are independently a substituent selected from the group consisting of hydrogen atoms, alkoxy groups having 1 to 6 carbon atoms, and alkoxy groups having 1 to 6 carbon atoms,
wherein, in a case where $X_4$, $X_5$, $X_6$, $X_7$, $X_8$, or $X_9$ are nitrogen, $R_7$, $R_9$, $R_{10}$, $R_{11}$, $R_{12}$ or $R_{13}$ bonded thereto respectively represent an unshared electron pair, and wherein $R_8$ and $R_{14}$ are independently a substituent selected from the group consisting of hydrogen atoms, alkyl groups having 1 to 6 carbon atoms, and alkoxy groups having 1 to 6 carbons, wherein the cathode has a cathode layer which includes a lithium-containing oxide, wherein the lithium-containing oxide is a lithium-containing transition metal oxide, and wherein the lithium-containing transition metal oxide is selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0<y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ and $LiFePO_4$, or their mixtures.

2. The lithium secondary battery according to claim 1, wherein the content of the hetero polycyclic compound is 0.05 to 20 parts by weight, based on 100 parts by weight of the nonaqueous electrolyte.

3. The lithium secondary battery according to claim 1, wherein the electrolyte salt is a lithium salt.

4. The lithium secondary battery according to claim 3, wherein an anion of the lithium salt is selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

5. The lithium secondary battery according to claim 1, wherein the organic solvent includes any one selected from the group consisting of linear carbonate, cyclic carbonate, ether, ester, and amide, or their mixtures.

6. The lithium secondary battery according to claim 5, wherein the linear carbonate includes any one selected from the group consisting of dimethyl carbonate, diethyl carbonate, dipropyl carbonate, ethylmethyl carbonate, methylpropyl carbonate and ethylpropyl carbonate, or their mixtures.

7. The lithium secondary battery according to claim 5, wherein the cyclic carbonate includes any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, and vinylethylene carbonate, or their halides and their mixtures.

8. The lithium secondary battery according to claim 5, wherein the ether includes any one selected from the group consisting of dimethyl ether, diethyl ether, dipropyl ether, methylethyl ether, methylpropyl ether and ethylpropyl ether, or their mixtures.

9. The lithium secondary battery according to claim 1, wherein the nonaqueous electrolyte further includes any one selected from the group consisting of cyclic sulfite, saturated sultone, unsaturated sultone, and non-cyclic sulfone, or their mixtures.

10. The lithium secondary battery according to claim 1, wherein the anode has an anode active material layer which includes lithium metal, carbon material, metal compound or their mixtures.

11. The lithium secondary battery according to claim 10, wherein the metal compound is a compound containing any one metal element selected from the group consisting of Si, Ge, Sn, Pb, P, Sb, Bi, Al, Ga, In, Ti, Mn, Fe, Co, Ni, Cu, Zn, Ag, Mg, Sr, and Ba, or their mixtures.

12. The lithium secondary battery according to claim 1, wherein the hetero polycyclic compound comprises at least one type of compound expressed by Chemical Formula 2 below:

Chemical Formula 2

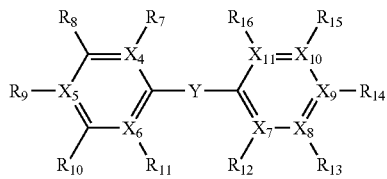

wherein $X_4$, $X_5$, $X_6$, $X_7$, $X_8$, $X_9$, $X_{10}$, and $X_{11}$ are independently a carbon atom or a nitrogen atom, where at least one of $X_4$, $X_5$, and $X_6$ is nitrogen, and at least one of $X_7$, $X_8$, $X_9$, $X_{10}$ and $X_{11}$ is nitrogen, provided that compounds wherein one of $X_4$, $X_5$, and $X_6$, is nitrogen, and simultaneously one of $X_7$, $X_8$, $X_9$, $X_{10}$, and $X_{11}$ is nitrogen are excluded, provided that compounds wherein $X_4$, $X_6$, $X_7$, and $X_{11}$ are nitrogen, and simultaneously $X_5$, $X_8$, $X_9$, and $X_{10}$ are carbon are excluded, and provided that compounds wherein three of $X_7$, $X_8$, $X_9$, $X_{10}$, and $X_{11}$ are nitrogen are excluded, provided that compounds wherein all of $X_4$, $X_5$, $X_6$, $X_7$, $X_8$, $X_9$, $X_{10}$, and $X_{11}$ are carbon are excluded, wherein, in a case where $X_4$, $X_5$, $X_6$, $X_7$, $X_8$, $X_9$, $X_{10}$, or $X_{11}$ are carbon, $R_7$, $R_9$, $R_{11}$, $R_{12}$, $R_{13}$, $R_{14}$, $R_{15}$ or $R_{16}$ bonded thereto are independently a substituent selected from the group consisting of hydrogen atoms, alkyl groups having 1 to 6 carbon atoms, and alkoxy groups having 1 to 6 carbon atoms, wherein, in a case where $X_4$, $X_5$, $X_6$, $X_7$, $X_8$, $X_9$, $X_{10}$, or $X_{11}$ are nitrogen, $R_7$, $R_9$, $R_{11}$, $R_{12}$, $R_{13}$, $R_{14}$, $R_{15}$ or $R_{16}$ bonded thereto respectively represent an unshared electron pair, wherein $R_8$ and $R_{10}$ are independently a substituent selected from the group consisting of hydrogen atoms, alkyl groups having 1 to 6 carbon atoms, and alkoxy groups having 1 to 6 carbon atoms, wherein Y is a single bond, oxygen or sulfur.

13. The lithium secondary battery according to claim 12, wherein the hetero polycyclic compound expressed by Chemical Formula 2 is one of compounds expressed by Chemical Formulas 6 to 8 below:

[Chemical Formula 6]

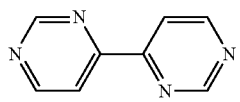

[Chemical Formula 7]

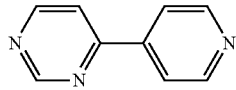

[Chemical Formula 8]

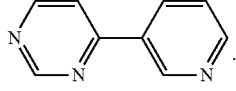

-continued

[Chemical Formula 14]

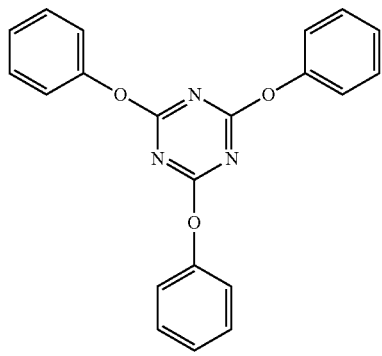

[Chemical Formula 15]

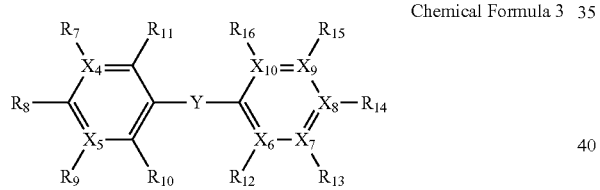

14. The lithium battery according to claim 1, wherein the hetero polycyclic compound comprises at least one type of compound expressed by Chemical Formula 3 below:

Chemical Formula 3

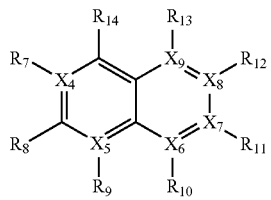

wherein $X_4$, $X_5$, $X_6$, $X_7$, $X_8$, $X_9$, and $X_{10}$ are independently a carbon atom or a nitrogen atom, where at least one of $X_4$ and $X_5$ is nitrogen, and at least one of $X_6$, $X_7$, $X_8$, $X_9$ and $X_{10}$ is nitrogen, provided that compounds wherein one of $X_4$, and $X_5$ is nitrogen, and simultaneously one of $X_6$, $X_7$, $X_8$, $X_9$, and $X_{10}$ is nitrogen are excluded, and provided that compounds wherein three of $X_6$, $X_7$, $X_8$, $X_9$, and $X_{10}$ are nitrogen are excluded, provided that compounds wherein all of $X_4$, $X_5$, $X_6$, $X_7$, $X_8$, $X_9$ and $X_{10}$ are carbon are excluded, wherein $X_4$, $X_5$, $X_6$, $X_7$, $X_8$, $X_9$, or $X_{10}$ are carbon, $R_7$, $R_9$, $R_{12}$, $R_{13}$, $R_{14}$, $R_{15}$ or $R_{16}$ bonded thereto are independently a substituent selected from the group consisting of hydrogen atoms, alkyl groups having 1 to 6 carbon atoms, and alkoxy groups having 1 to 6 carbon atoms, wherein, in a case where $X_4$, $X_5$, $X_6$, $X_7$, $X_8$, $X_9$, or $X_{10}$ are nitrogen, $R_7$, $R_9$, $R_{12}$, $R_{13}$, $R_{14}$, $R_{15}$ or $R_{16}$ bonded thereto respectively represent an unshared electron pair, wherein $R_8$, $R_{10}$ and $R_{11}$ are independently a substituent selected from the group consisting of hydrogen atoms, alkyl groups having 1 to 6 carbon atoms, and alkoxy groups having 1 to 6 carbon atoms, wherein Y is a single bond, oxygen or sulfur.

15. The lithium secondary battery according to claim 14, wherein the hetero polycyclic compound expressed by Chemical Formula 3 is one of compounds expressed by Chemical Formulas 16 to 19 below:

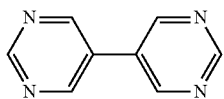

[Chemical Formula 16]

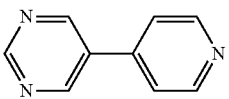

[Chemical Formula 17]

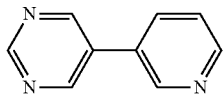

[Chemical Formula 18]

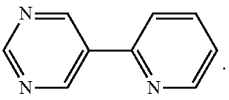

[Chemical Formula 19]

16. The lithium battery according to claim 1, wherein the hetero polycyclic compound comprises at least one type of compound expressed by Chemical Formula 4 below:

Chemical Formula 4 wherein $X_4$, $X_5$, $X_6$, $X_7$, $X_8$, and $X_9$ are independently a carbon atom or a nitrogen atom, where at least one of $X_4$ and $X_5$ is nitrogen, and at least one of, $X_6$, $X_7$, $X_8$, and $X_9$ is nitrogen, provided that compounds wherein all of $X_4$ and $X_5$ are nitrogen, and simultaneously all of $X_6$ and $X_9$ are nitrogen are excluded, and provided that compounds wherein all of $X_4$, $X_5$, $X_6$, $X_7$, $X_8$ and $X_9$ are carbon are excluded, wherein, in a case where $X_4$, $X_5$, $X_6$, $X_7$, $X_8$, or $X_9$ are carbon, $R_7$, $R_9$, $R_{10}$, $R_{11}$, $R_{12}$ or $R_{13}$ bonded thereto are independently a substituent selected from the group consisting of hydrogen atoms, alkoxy groups having 1 to 6 carbon atoms, and alkoxy groups having 1 to 6 carbon atoms, wherein, in a case where $X_4$, $X_5$, $X_6$, $X_7$, $X_8$, or $X_9$ are nitrogen, $R_7$, $R_9$, $R_{10}$, $R_{11}$, $R_{12}$ or $R_{13}$ bonded thereto respectively represent an unshared electron pair, and wherein $R_8$ and $R_{14}$ are independently a substituent selected from the group consisting of hydrogen atoms, alkyl groups having 1 to 6 carbon atoms, and alkoxy groups having 1 to 6 carbons.

17. The lithium secondary battery according to claim 16, wherein the hetero polycyclic compound expressed by Chemical Formula 4 is one of compounds expressed by Chemical Formulas 21 to 26 below:

[Chemical Formula 21]
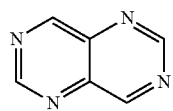
[Chemical Formula 22]
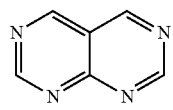
[Chemical Formula 23]
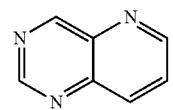
[Chemical Formula 24]
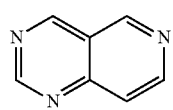
[Chemical Formula 25]
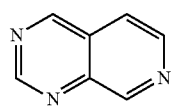
[Chemical Formula 26]
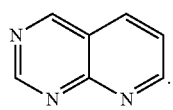
* * * * *